(12) United States Patent
Meena et al.

(10) Patent No.: US 12,602,266 B2
(45) Date of Patent: Apr. 14, 2026

(54) EPHEMERAL DISTRIBUTED LOCKING IN MICROSERVICE SYSTEMS

(71) Applicant: VMware LLC, Palo Alto, CA (US)

(72) Inventors: Amit Meena, Pune (IN); Ashish Agrawal, Pune (IN); Priyanka Malode, Pune (IN); Mandar Phatak, Pune (IN); Ankit Bhartiya, Pune (IN)

(73) Assignee: VMware LLC, Palo Alto, CA (US)

( * ) Notice: Subject to any disclaimer, the term of this patent is extended or adjusted under 35 U.S.C. 154(b) by 183 days.

(21) Appl. No.: 18/231,803

(22) Filed: Aug. 9, 2023

(65) Prior Publication Data

US 2024/0403142 A1 Dec. 5, 2024

(30) Foreign Application Priority Data

Jun. 5, 2023 (IN) .............................. 202341038552

(51) Int. Cl.
*G06F 9/52* (2006.01)
*G06F 9/50* (2006.01)

(52) U.S. Cl.
CPC ............ *G06F 9/526* (2013.01); *G06F 9/5033* (2013.01)

(58) Field of Classification Search
CPC .............................. G06F 9/526; G06F 9/5033
See application file for complete search history.

(56) References Cited

U.S. PATENT DOCUMENTS

| | | | | |
|---|---|---|---|---|
| 11,228,656 B1 * | 1/2022 | Celestine | ................ | G06F 9/542 |
| 11,853,448 B1 * | 12/2023 | Bhuyan | ............... | G06F 21/6218 |
| 11,941,446 B1 * | 3/2024 | Greene | ................ | G06F 9/5016 |
| 2021/0149742 A1 * | 5/2021 | Turanyi | ............... | G06F 9/5033 |
| 2021/0240544 A1 * | 8/2021 | Ramachandran | ....... | G06F 9/262 |
| 2022/0164237 A1 * | 5/2022 | King | ......................... | G06F 8/71 |
| 2022/0200961 A1 * | 6/2022 | Chan | ................... | H04L 63/0263 |
| 2022/0360646 A1 * | 11/2022 | Guim Bernat | .......... | H04L 49/20 |
| 2024/0115957 A1 * | 4/2024 | Colenbrander | ......... | A63F 13/77 |
| 2024/0330077 A1 * | 10/2024 | Pasupathilingam | .... | G06F 9/546 |
| 2024/0364603 A1 * | 10/2024 | Viklund | ................. | H04L 67/10 |

* cited by examiner

*Primary Examiner* — Henry Tsai
*Assistant Examiner* — Christopher A Daley
(74) *Attorney, Agent, or Firm* — Quarles & Brady LLP

(57) ABSTRACT

Ephemeral distributed locking in microservice systems is disclosed, A disclosed example system to manage microservices of a shared resource system includes interface circuitry, programmable circuitry, machine readable instructions to cause the programmable circuitry to: permit a first container to lock a microservice based on an annotation of the first container, the annotation corresponding to a request for utilization of locking semantics to lock the microservice, after the microservice is locked for use by the first container, prevent a second container requesting utilization of the locking semantics to lock the microservice based on the microservice being locked to the first container, and, after expiration of a time period, release the microservice from being locked for use by the first container.

26 Claims, 11 Drawing Sheets

EPHEMERAL DISTRIBUTED LOCKING IN MICROSERVICE SYSTEMS

RELATED APPLICATIONS

Benefit is claimed under 35 U.S.C. 119 (a)-(d) to Foreign application No. 202341038552 filed in India entitled "EPHEMERAL DISTRIBUTED LOCKING IN MICROSERVICE SYSTEMS", on Jun. 5, 2023, by VMware, Inc., which is herein incorporated in its entirety by reference for all purposes.

FIELD OF THE DISCLOSURE

This disclosure relates generally to distributed computing and, more particularly, to ephemeral distributed locking in microservice systems.

BACKGROUND

In recent years, cloud-based systems have enabled distribution and scalability of computational services and/or resources. Particularly, microservice architectures utilized a cloud-based approach in which execution of a single application is composed of independently and/or discretely deployable smaller components or services referred to as microservices. Locks are synchronization mechanisms that are used to coordinate access to shared resources by ensuring that only one process or thread can access the resource at a time. In a distributed computational environment, locks can be essential to prevent race conditions and ensure data consistency.

Figure 1:
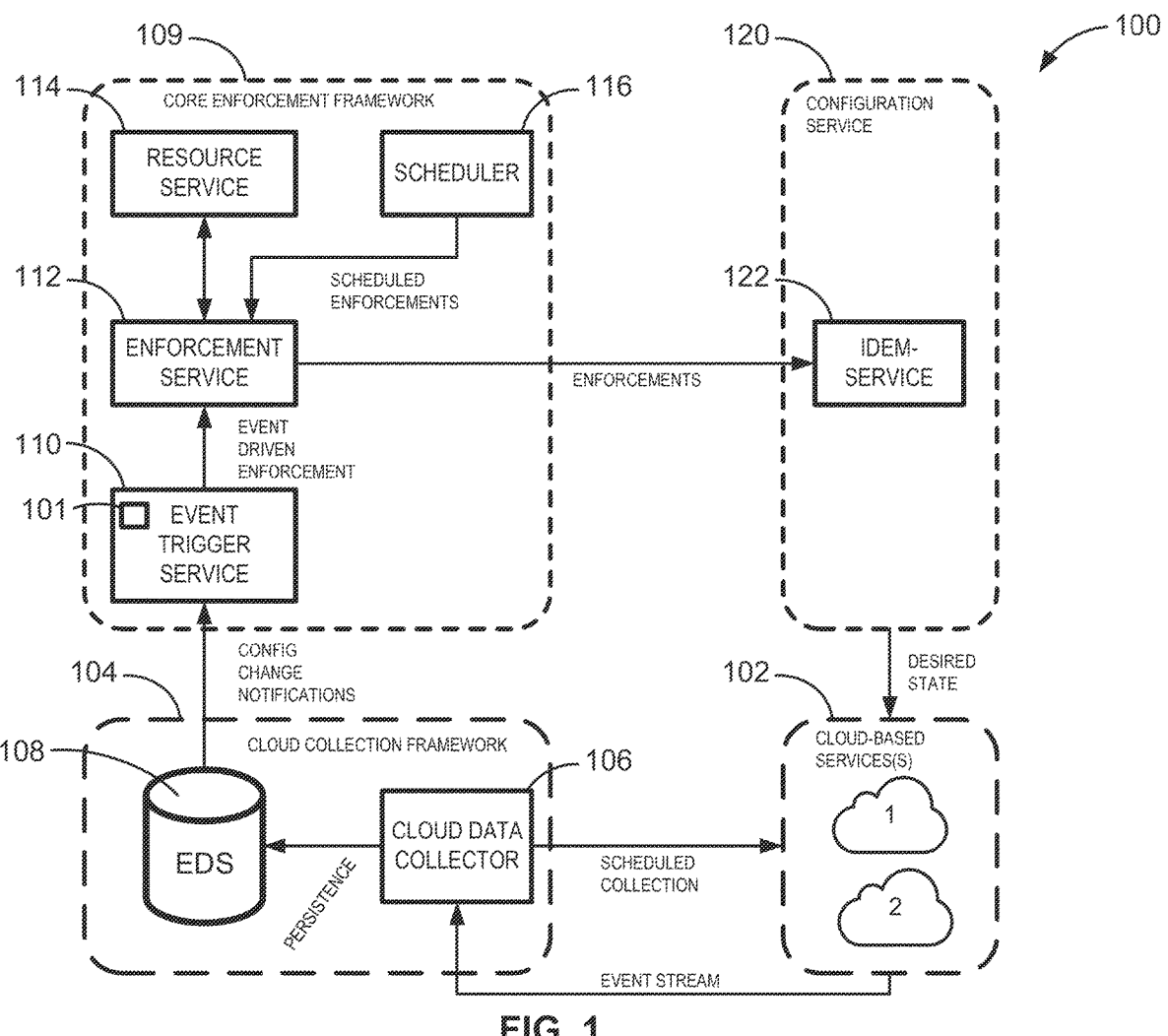
FIG. 1 is a block diagram of an example environment in which an example lock control device in accordance with teachings of this disclosure can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable micropro- cessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Process- ing Units (NPUs) one or more microcontrollers that may execute first instructions to perform one or more operations and/or functions and/or integrated circuits such as Applica- tion Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, induc- tors, resistors, current paths, diodes, etc. For example an integrated circuit may be implemented as one or more of an ASIC, an FPGA, a chip, a microchip, programmable cir- cuitry, a semiconductor substrate coupling multiple circuit elements, a system on chip (SoC), etc.

DETAILED DESCRIPTION

Ephemeral distributed locking in microservice systems is disclosed. In distributed computation/computing systems, such as cloud services, for example, locks are utilized. These locks function as synchronization mechanisms that are used to coordinate access to shared resources, such as microser- vices, by ensuring that only one process or thread can access a shared resource at a given time. In a distributed compu- tation environment, locks are utilized in conjunction with the shared resource to prevent race conditions and ensure data consistency.

Examples disclosed herein implement a distributed lock- ing mechanism for shared services that is both reliable and efficient while accounting for network latency, coordination/ consensus, fault tolerance, and scalability. In prior systems, utilization of locking can necessitate a significant under- standing of distributed computing systems and networking such that control of such locking can be complex and, thus, lead to improper or unintended errors with respect to locking resources/tools/methodologies. In particular, lock requests and/or instructions can be integrated into code (e.g., busi- ness code), but defined and/or executed in an erroneous or inconsistent manner by prior systems. As a result, these lock requests and/or instructions in prior systems can work inconsistently in securing access to resources and/or pre- venting access to a resource even though the resource is not being utilized. Further, the lock requests and/or instructions can add unnecessary complexity to the aforementioned code.

Examples disclosed herein can facilitate a declarative methodology for locking/mutual exclusion semantics in a Java-based programming language, for example, that can significantly reduce overall development and management efforts with respect to locking semantics. According to examples disclosed herein, designated or predefined anno- tations (e.g., designated Java-based annotations) can be applied to code segments to ensure that mutual exclusion semantics are enforced with respect to the code segment when the code segment is being executed. The aforemen- tioned annotations can be implemented as metadata to provide additional information about code elements, such as classes, methods, variables, and interfaces. According to examples disclosed herein, the annotations may be imple- mented to specify a manner in which the code segment should be processed and/or to provide information for tools or frameworks that process and/or execute the code. The code segment can be part of, be encapsulated in and/or define a container.

Examples disclosed herein can be implemented in a distributed computing system or a system that manages and/or interfaces with the distributed computing system, such as the Cloud Guardrails system by VMware®. Examples disclosed herein can be applied to locking, sema- phore, mutual exclusion, authentication or dead letter queue implementations, etc. Examples disclosed herein utilize, process, direct and/or receive a first container that requests access to a resource (e.g., a microservice) of a distributed computing system (e.g., a cloud service system) with an annotation, and a second container that requests access to the same resource with another annotation or other request to lock the same resource. According to examples disclosed herein, an annotation can be implemented to request and/or invoke locking semantics associated with the distributed computing system. In a specific example, the first container is permitted access to the resource such that the resource is locked to the first container for a defined time period based on the annotation of the first container. During that time period (e.g., before the time period elapses), the second container (or any other container(s)) is prevented and/or restricted from accessing the resource.

According to examples disclosed herein, the lock is released with respect to the first container once the afore- mentioned time period elapses. In contrast to known sys- tems, utilization of annotations prevents a scenario in which the resource is dead locked and/or inefficient utilization of the resource. Examples disclosed herein can also reduce (e.g., eliminate) situations in which manual intervention or correction is necessitated.

In some examples, if the first container holding the lock of the resource abruptly terminates (e.g., execution of the first container ends before the time period elapses), the lock of the resource pertaining to the first container is released. In some such examples, the second container can be directed to the resource in response to the first container releasing the lock. Additionally or alternatively, the lock is released in response to the first container finishing execution of its code. According to some examples disclosed herein, the first and second containers are stored (e.g., temporarily stored) in cache memory and then provided to a system that directs operation and/or configuration of the resource. In some examples, at least one of the first or second annotations is invoked in a code layer. In some examples, a resource not being available prevents the first and second containers from being able to lock the resource. In some such examples, one of the first or second containers is able to lock the resource upon availability of the same.

FIG. 1 is a schematic block diagram of an example environment 100 in which an example microservice lock control device 101 that operates to manage access and/or utilization of microservices of a distributed computing system can be implemented. In the illustrated example of FIG. 1, aspects and/or components of the environment 100 function as a system that manages operations and usage of at least one cloud-based service 102. The management of the operations can pertain to configuring settings, managing resource usage and/or managing access of the cloud-based service(s) 102. The example architecture shown in the example of FIG. 1 is only an example and any appropriate other architecture, network, control scheme, communication and/or data topology can be implemented instead.

According to examples disclosed herein, an example cloud collection framework 104 includes an example cloud data collector 106 to coordinate and communicate with the cloud-based service(s) 102. The example cloud data collector 106 can extract, receive and/or query information (e.g., components, metadata, services, service information) from the cloud-based service(s) 102. In this example, the cloud data collector 106 can request and/or direct the cloud-based service(s) 102 to provide information related to: (1) accounts utilizing the cloud-based service(s) 102, (2) at least one configuration of the cloud-based service(s) 102 and/or (3) services of the cloud-based service(s) 102. The request by the cloud data collector 106 to the cloud-based service(s) 102 can be driven by an occurrence of an event or performed on periodic or aperiodic timeframes and/or on a schedule. According to examples disclosed herein, the cloud-based service(s) 102 provide(s) data, requested changes, configuration information and/or updates associated with the cloud-based service(s) 102 to the cloud data collector 106 in response to a query from the cloud data collector 106 or without receiving a query from the cloud data collector 106. In some examples, the aforementioned data and/or updates provided to the cloud data collector 106 can include changes to a configuration of the cloud-based service(s) 102 and/or operational data of the cloud-based service(s) 102.

In this example, the aforementioned cloud collection framework 104 also includes an example entity data service (EDS) 108. The example EDS 108 can be implemented as a database, a data store, a database manager and/or a database framework to store and/or collect data associated with the cloud-based service(s) 102. The example EDS 108 stores entity data of the cloud-based service(s) 102 in a normalized form (e.g., as a centralized repository). According to examples disclosed herein, the EDS 108 can provide any requested or proposed configuration change request to a core enforcement framework 109 which, in turn, includes an example event trigger service 110 that implements the aforementioned microservice lock control device 101, an example enforcement service 112, an example resource service 114 and an example scheduler 116. For example, when an event occurs, such as a rule change and/or a configuration change corresponding to the cloud-based service(s) 102, a notification from the EDS 108 is provided to the event trigger service 110.

The event trigger service 110 of the illustrated example is implemented to direct enforcement, configuration changes and/or access to services (e.g., microservices) of the cloud-based service(s) 102. The example event trigger service 110 can map a configuration change event to a desired state of the cloud service(s). Accordingly, the example event trigger service 110 can direct control, usage and/or configuration of the cloud-based service(s) 102 via (or in conjunction with) the aforementioned enforcement service 112. In this example, the event trigger service 110 provides requests and/or commands pertaining to event-driven enforcement of the cloud-based service(s) 102 to the enforcement service 112. In some examples, the event trigger service 110 manages and/or directs changes to key value data stores. In some examples, the event trigger service 110 can utilize and/or implement a Kubernetes cluster.

The example enforcement service 112 determines, manages and provides enforcements (e.g., configuration changes, access changes, resource usage instructions, a desired state change, etc.) with respect to the cloud-based service(s) 102 to a configuration service 120 based on the event-driven enforcements and/or instructions received from the event trigger service 110. Additionally or alternatively, notifications (e.g., configuration change notifications), enforcements and/or instructions received from the resource service 114 and the scheduler 116 cause the enforcement service 112 to provide enforcements to the configuration service 120. In turn, the enforcements provided to the configuration service 120 are subsequently provided to the cloud-based service(s) 102 as desired state changes (e.g., desired state change instructions or directives).

In this example, the resource service 114 stores and/or manages operational data and/or settings of the cloud-based service(s) 102. In this example, the resource service 114 contains, analyzes and/or manages metadata of the cloud-based service(s) 102 that is utilized to manage the cloud-based service(s) 102. In particular, the metadata corresponds to settings, access information and/or configurations of the cloud-based service(s) 102, for example.

In some examples, the aforementioned scheduler 116 directs and/or manages scheduled implementations, configuration changes, enforcements and/or updates (e.g., periodic updates) of the cloud-based service(s) 102 via the example enforcement service 112 and the configuration service 120. For example, the scheduler 116 can schedule the enforcement service 112 to perform scheduled enforcements of the configuration service 120 which, in turn, controls and/or directs a desired state of the cloud-based service(s) 102.

To control, manage, enforce and/or direct operation of the cloud-based service(s) 102, as mentioned above, the example enforcement service 112 provides the enforcements to the configuration service 120. In this example, the configuration service 120 includes an idempotent (IDEM) service 122 that is distinct from the core enforcement framework 109 and, thus, the enforcement service 112. However, the IDEM service 122 can be integrated with the enforcement service 112 and/or the core enforcement framework 109 in other examples. In the illustrated example of FIG. 1, the IDEM service 122 is an implementation/provisioning engine that implements desired state changes with respect to the cloud-based service(s) 102. In other words, the IDEM service 122 controls a desired state of the cloud-based service(s) 102 based on enforcements provided from the enforcement service 112. While the microservice lock control device 101 is shown implemented in the example event trigger service 110 the microservice lock control device 101 can, additionally or alternatively, be implemented in the enforcement service 112, the resource service 114 and/or the scheduler 116.

As mentioned above, any appropriate data topology, architecture and/or structure can be implemented instead. Further, any of the aforementioned aspects and/or elements described in connection with FIG. 1 can be combined or separated as appropriate. Further, while examples disclosed herein are shown in the context of cloud services, examples disclosed herein can be implemented in conjunction with any appropriate distributed and/or shared computing resource system.

Figure 2:
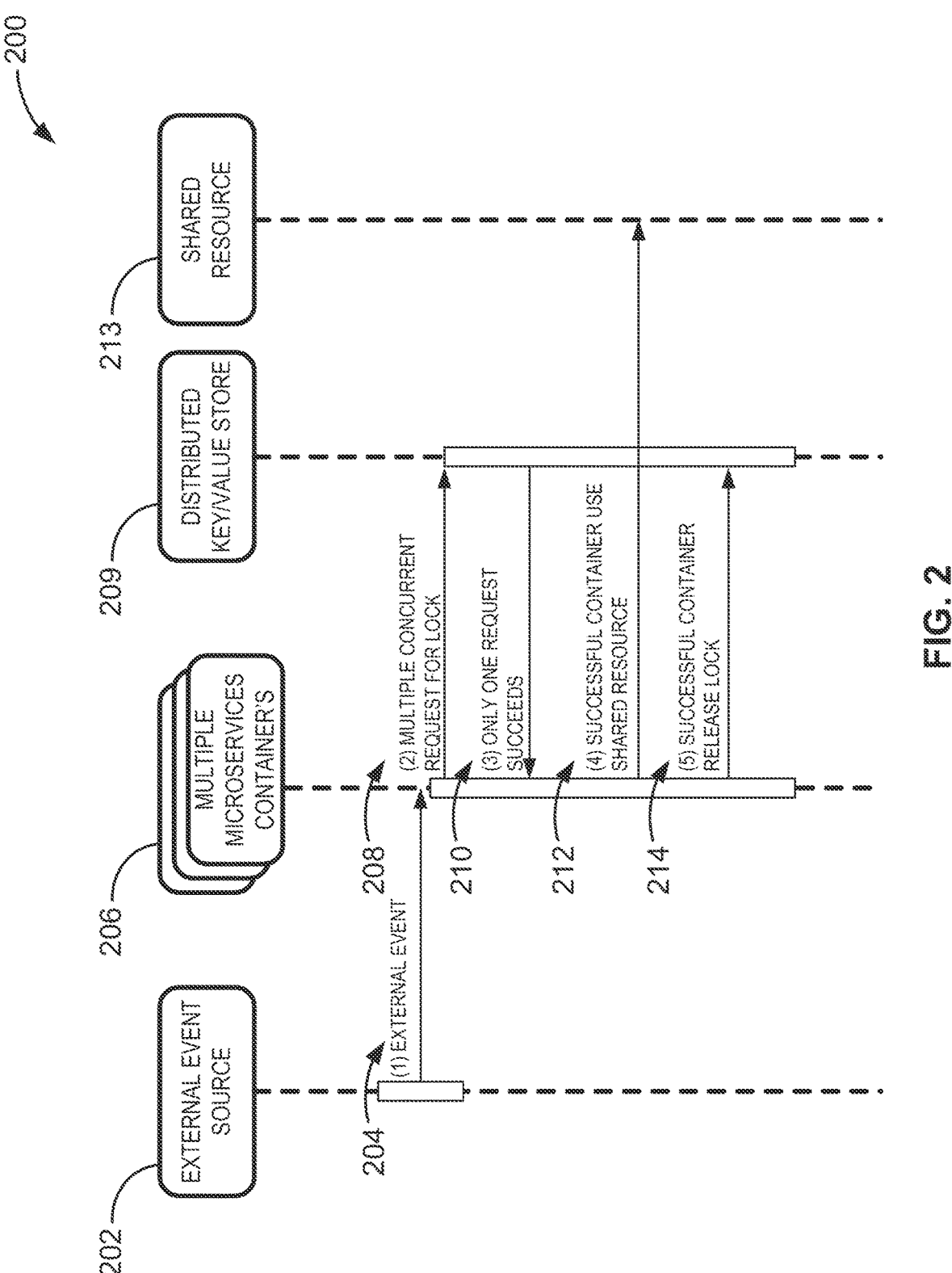
FIG. 2 is an example process flow of the example microservice lock control device of FIG. 1.

FIG. 2 is an example process flow 200 of the example microservice lock control device 101 of FIG. 1. According to examples disclosed herein, the example microservice lock control device 101 shown in FIG. 1 can perform the process flow 200 for management of a microservice to be accessed and/or utilized by multiple containers.

In the illustrated example of FIG. 2, an external event source 202 of the cloud-based service(s) 102 (e.g., a configuration change and/or change request of the cloud-based service(s) 102 received at the cloud data collector 106) shown in FIG. 1 triggers an external event source 202 to cause and/or indicate an external event at step 204. Accordingly, at step 208, the external event of step 204 causes multiple microservice containers 206 to be deployed (e.g., at the event trigger service 110) to a distributed key/value store 209, which may be part of the event trigger service 110, the enforcement service 112 and/or the IDEM service 122. In some examples, the microservice containers 206 are stored (e.g., temporarily held) in cache memory prior to being managed and/or directed by the event trigger service 110. At the aforementioned step 208, multiple requests (e.g., concurrent requests) are provided for a lock corresponding to a microservice. While multiple requests are provided to lock the same microservice, at step 210, only one of the containers is successful in obtaining and/or reserving the lock of the microservice and the ability to utilize, configure and/or access the microservice. In some examples, a confirmation and/or response of the lock is provided by the distributed key/value store 209. At step 212, the container that successfully locked the microservice can utilize, access and/or configure the microservice of a shared resource 213. At step 214, the lock held by the container is released after a time duration or time period has elapsed. Additionally or alternatively, the lock is released based on abrupt and/or premature termination of execution of the container holding the lock.

Figure 3:
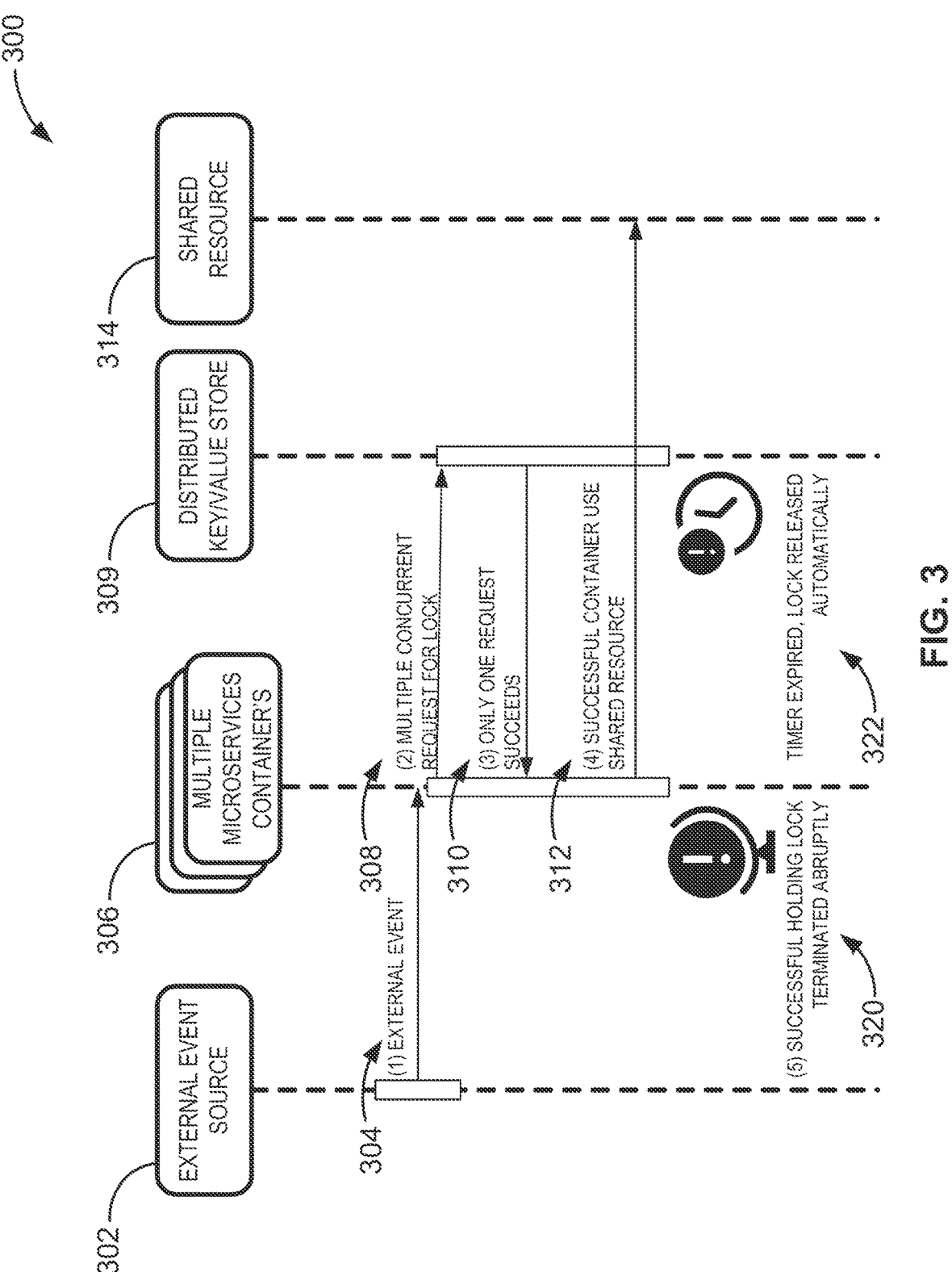
FIG. 3 is another example process flow of the example microservice lock control device of FIG. 1.

FIG. 3 is another example process flow 300 of the example microservice lock control device 101 of FIG. 1. The example process flow 300 is similar to that of the example process flow 200 shown in FIG. 2 but, instead, a scenario related to abrupt container execution termination is depicted. In this example, an external event source 302 of the cloud-based service(s) 102 (e.g., received at the cloud data collector 106) shown in FIG. 1 triggers the external event source 302 to indicate and/or transmit a notification of an external event at step 304. In this example, at step 308, the external event of step 304 causes multiple microservice containers 306 to be deployed (e.g., at the event trigger service 110) at step 308 to a distributed key/value store 309, which may be part of the event trigger service 110, the enforcement service 112 and/or the IDEM service 122. At step 310, only one of the containers is successful at securing a lock of the microservice such that the key/value store 309 provides a receipt and/or confirmation of the container securing the lock. At step 312, the container utilizes, accesses and/or configures a shared resource 314 of the microservice based on securing the lock. In contrast to the example of FIG. 2, the container that secured the lock abruptly ceases operation and/or ends (e.g., code of the container abruptly stops execution and/or malfunctions) at step 320. In the illustrated example of FIG. 3, at step 322, the lock is released (e.g., automatically released) based on an execution timer expiring and/or a duration time of the lock expiring.

Figure 4:
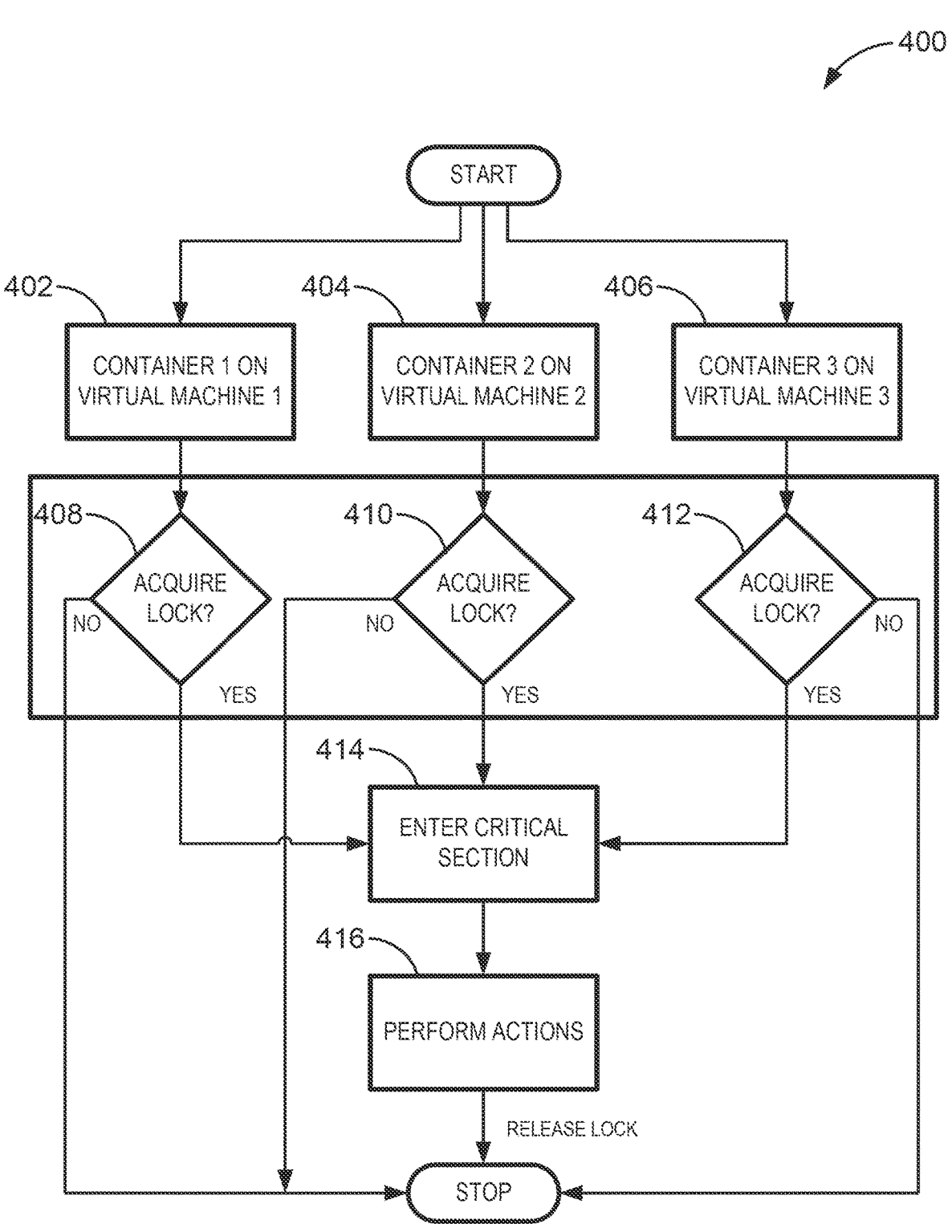
FIG. 4 is another example process flow of the example microservice lock control device of FIG. 1.

FIG. 4 is another example process flow 400 of the example microservice lock control device 101 of FIG. 1. The example process flow 400 of FIG. 4 depicts three different virtual machine (VM) containers 402, 404, 406. In this example, steps 408, 410, 412 pertain to whether the VM containers 402, 404, 406, respectively, obtain a lock of a microservice. At step 414, one of the containers 402, 404, 406 enters a critical section to perform actions (e.g., utilize the microservice, configure the microservice, direct operation of the microservice, etc.) at step 416. In turn, the process ends and the lock is released. In this example, the two of the containers 402, 404, 406 that did not secure the lock are terminated and/or not executed.

Figure 5:
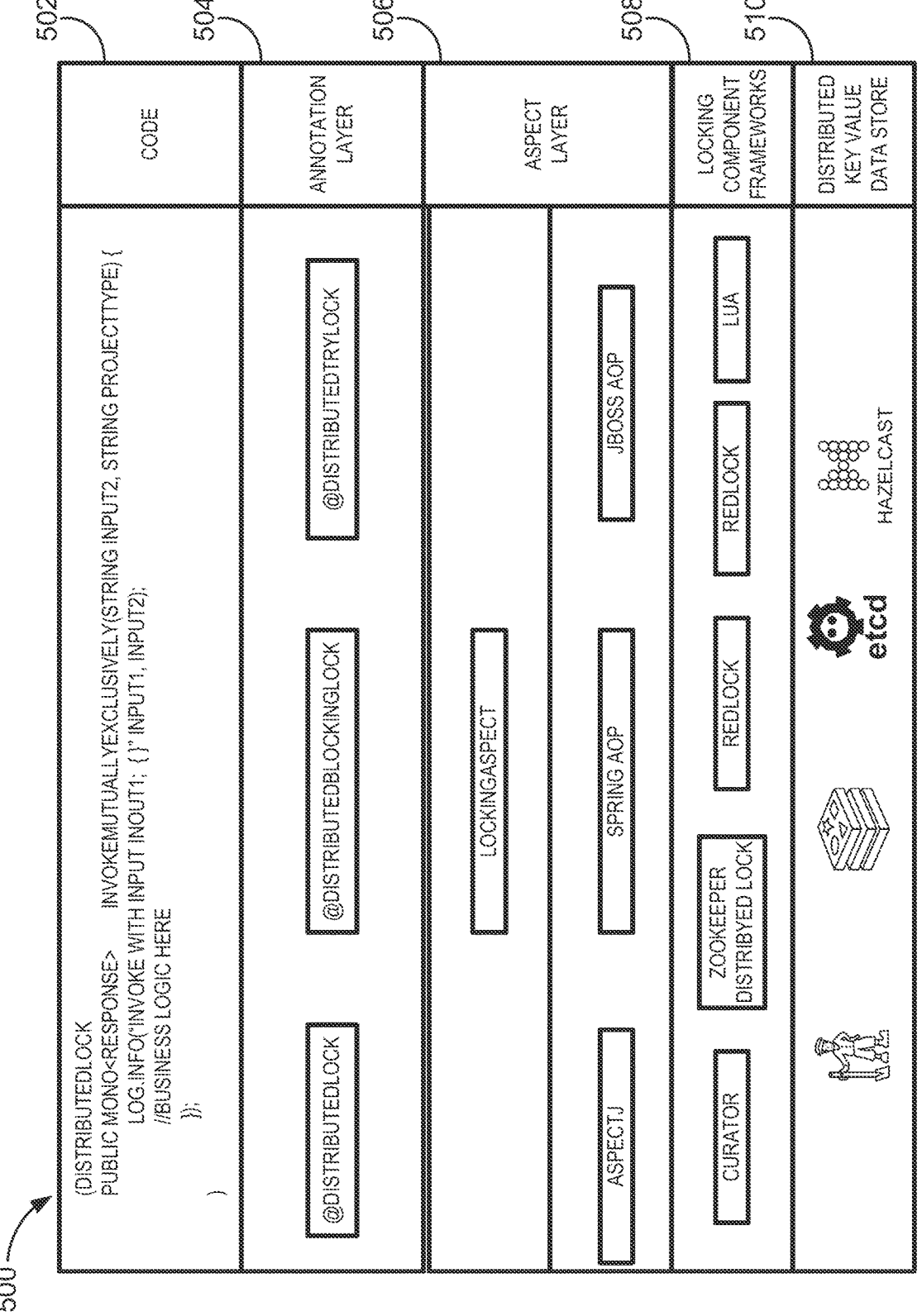
FIG. 5 illustrates an example code hierarchy that can be implemented in accordance with examples disclosed herein.

FIG. 5 illustrates an example code hierarchy 500 that can be implemented in examples disclosed herein. The example code hierarchy 500 can correspond to implementing locking requests and/or instructions in containers that are managed by the example microservice lock control device 101 and/or the event trigger service 110 shown in FIG. 1. In this example, a layer 502 represents a code layer in which locking semantics are invoked via code. According to examples disclosed herein, the following pseudocode can be implemented to invoke a locking semantic such that business logic is separated from the annotation declaration called @DistributedLock:

```
@DistributedLock
public Mono<Response> invokeMutuallyExclusively(String input1, String
input2, String projectType) {
log.info("invoked with input input1: { } , input2: { }", input1, input2);
//Business logic here
});
```

In examples disclosed herein, business logic is code and/or programming that is executed to perform tasks, configuration changes and/or operations of a microservice. By separating the locking semantics from the business logic, examples disclosed herein can advantageously utilize a uniform invocation of locking that does not complicate the business logic, thereby avoiding potential errors, incorrect locking and/or unintended operation of the microservice. As a result of separating programming and/or code corresponding to locking semantics invoked by an annotation from the business logic, programming can be greatly simplified and, thus, can be more reliable and produced in a faster manner. Further, examples disclosed herein can also increase computational resource savings by invoking locking semantics in a more efficient manner in comparison to integrating the locking semantics with the business logic.

In this example, an annotation layer 504 pertains to execution of the annotations while a layer 506 is an aspect layer corresponding to locking aspects. An example layer 508 corresponds to example locking component frameworks while an example layer 510 corresponds to example open source key value store programs that manage a distributed key value data store layer.

According to examples disclosed herein, designated annotations (e.g., designated Java-based annotations) in the code layer 502 and/or the annotated layer 504 can be applied to code segments to ensure that mutual exclusion semantics are enforced on the code segment when the code segment is being executed. The aforementioned annotations can be implemented as metadata to provide additional information about code elements, such as classes, methods, variables, and interfaces. According to examples disclosed herein, the annotations may be implemented to specify a manner in which the code segment should be processed and/or to provide information for tools or frameworks that process and/or execute the code. Annotations in Java are defined using the @ symbol followed by the annotation name.

According to examples disclosed herein, annotations invoked as @DistributedLock, @DistributedBlockingLock, and @DistributedBlockinglock can be implemented to utilize locking semantics according to examples disclosed herein. For example, @DistributedLock can be implemented as a nonblocking version of a lock ( ) method. In such examples, invocation of this annotation results in an attempt to acquire a lock immediately and returns true if locking succeeds.

According to some examples, @DistributedBlocking-Lock can be implemented to acquire a lock if the lock is available. If the lock is not available, a thread can be blocked until the lock is released. According to examples disclosed herein, a lock acquisition via this annotation is blocking and code can wait until the lock becomes available and then subsequently acquire the lock. If the lock is already held by another container, the calling container will be blocked until the lock is released by the other container. Accordingly, the calling container will be put on hold and will not execute any code until the container can acquire the lock, for example.

In some examples, @DistributedtTryLock (long timeout, TimeUnit timeUnit) causes a wait up to a given timeout before giving up trying to acquire the lock.

The example annotations and/or metadata structures described in connection with FIG. 5 are only examples and appropriate other annotations and/or instructions can be implemented instead. Further, any appropriate utilization of layering structure and/or components can be utilized instead.

Figure 6:
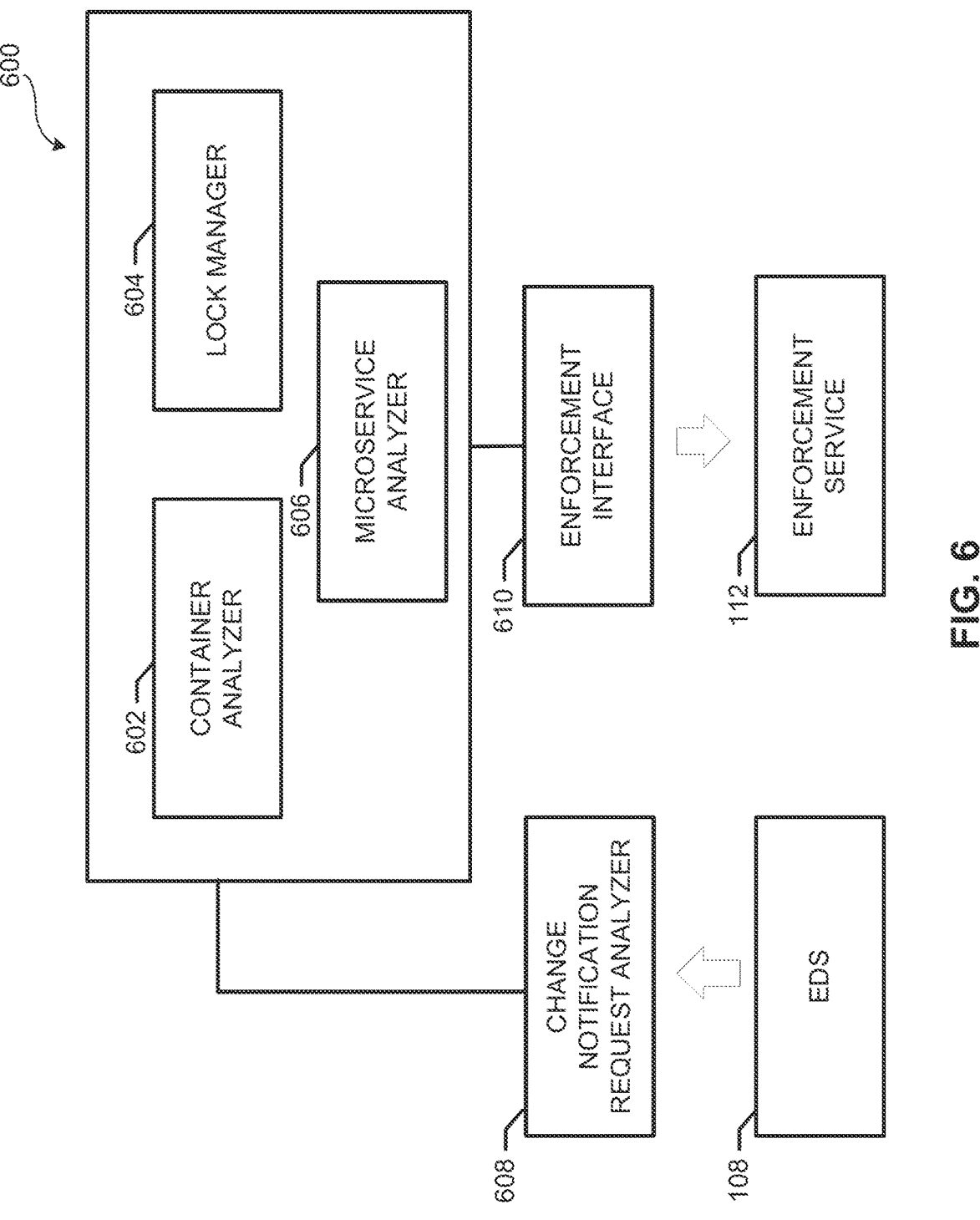
FIG. 6 is a block diagram of an example lock control analysis system that can be implemented in examples disclosed herein.

FIG. 6 is a block diagram of an example implementation of the microservice lock control device 101 of FIG. 1 to manage locks and/or reservation of locks of microservices. According to examples disclosed herein, a lock control analysis system 600 can be implemented in the microservice lock control device 101 and/or the event trigger service 110 shown in FIG. 1, for example, and manages access and/or locking of multiple containers corresponding to distributed services and/or settings of the cloud-based service(s) 102. The example lock control analysis system 600 of FIG. 6 may be instantiated (e.g., creating an instance of, bring into being for any length of time, materialize, implement, etc.) by programmable circuitry such as a Central Processor Unit (CPU) executing first instructions. Additionally or alternatively, the lock control analysis system 600 of FIG. 6 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 6 may, thus, be instantiated at the same or different times. Some or all of the circuitry of FIG. 6 may be instantiated, for example, in one or more threads executing concurrently on hardware and/or in series on hardware. Moreover, in some examples, some or all of the circuitry of FIG. 6 may be implemented by microprocessor circuitry executing instructions and/or FPGA circuitry performing operations to implement one or more virtual machines and/or containers.

The lock control analysis system 600 of the illustrated example includes container analyzer 602, example lock manager 604, and example microservice analyzer 606. The example lock control analysis system 600 includes and/or is communicatively coupled to change notification request analyzer 608 and enforcement interface 610.

The container analyzer 602 of the illustrated example analyzes containers associated with change notification requests with respect to the cloud-based service(s) 102. In this example, the container analyzer 602 analyzes containers including respective requests to lock a microservice related to the cloud-based service(s) 102. In particular, the container analyzer 602 determines whether individual ones of the containers include an annotation that is designated for requesting a lock and/or utilization of locking semantics with respect to the cloud-based service(s) 102. Additionally or alternatively, the container analyzer 602 determines what type of lock action (e.g., a duration-based lock, a lock that returns a value once a container obtains a lock, etc.) is being requested (e.g., based on a category of annotation such that the different categories correspond to different types of locking actions). In some examples, the container analyzer 602 is instantiated by programmable circuitry executing container analyzer instructions and/or configured to perform operations such as those represented by the flowchart of FIG. 7.

In this example, the lock manager 604 determines whether the microservice is already locked (e.g., prior to the aforementioned containers requesting locking of the microservice) and/or controls locking of the microservice. In this example, the lock manager 604 enables and/or permits locking of the microservice based on an annotation, thereby preventing another lock with an annotation to lock the microservice. In some examples, the lock manager 604 determines a remaining time duration that the current lock will last and/or a time at which the current lock will expire (e.g., to facilitate enabling one of the containers to access the lock). In some examples, the lock manager 604 is instantiated by programmable circuitry executing lock manager instructions and/or configured to perform operations such as those represented by the flowchart of FIG. 7.

The example microservice analyzer 606 is implemented to determine if the microservice has been successfully utilized, updated and/or configured based on executing requests, instructions and/or directives from a container. Additionally or alternatively, the microservice analyzer 606 is implemented to determine a status, configuration and/or operational state of the microservice. In some examples, the microservice analyzer 606 is instantiated by programmable circuitry executing microservice analyzer instructions and/or configured to perform operations such as those represented by the flowchart of FIG. 7.

According to some examples disclosed herein, the change notification request analyzer 608 is implemented to analyze and/or characterize events and/or requested changes (e.g., event-driven requested changes) corresponding to the EDS 108. According to examples disclosed herein, the change notification request analyzer 608 provides event-driven notifications from the EDS 108 to the event trigger service 110 shown in FIG. 1. In some examples, the change notification request analyzer 608 is instantiated by programmable circuitry executing change notification request instructions and/or configured to perform operations such as those represented by the flowchart of FIG. 7.

In the illustrated example of FIG. 6, the enforcement interface 610 is implemented to instruct the enforcement service 112 to provide and/or transmit enforcements (e.g., enforcement instructions) with respect to the cloud-based service(s) 102. In particular, the example enforcement interface 610 directs event-driven enforcements from the event trigger service 110 to the enforcement service 112. In some examples, the enforcement interface 610 is instantiated by programmable circuitry executing enforcement interface instructions and/or configured to perform operations such as those represented by the flowchart of FIG. 7.

While an example manner of implementing the lock control analysis system 600 of FIG. 6 is illustrated in FIG. 6, one or more of the elements, processes, and/or devices illustrated in FIG. 6 may be combined, divided, re-arranged, omitted, eliminated, and/or implemented in any other way. Further, the example container analyzer 602, the example lock manager 604, the example microservice analyzer 606, the example change notification request analyzer 608, the example enforcement interface 610, and/or, more generally, the example lock control analysis system 600 of FIG. 6, may be implemented by hardware alone or by hardware in combination with software and/or firmware. Thus, for example, any of the example container analyzer 602, the example lock manager 604, the example microservice analyzer 606, the example change notification request analyzer 608, the example enforcement interface 610, and/or, more generally, the example lock control analysis system 600, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example lock control analysis system 600 of FIG. 6 may include one or more elements, processes, and/or devices in addition to, or instead of, those illustrated in FIG. 6, and/or may include more than one of any or all of the illustrated elements, processes and devices.

Figure 7:
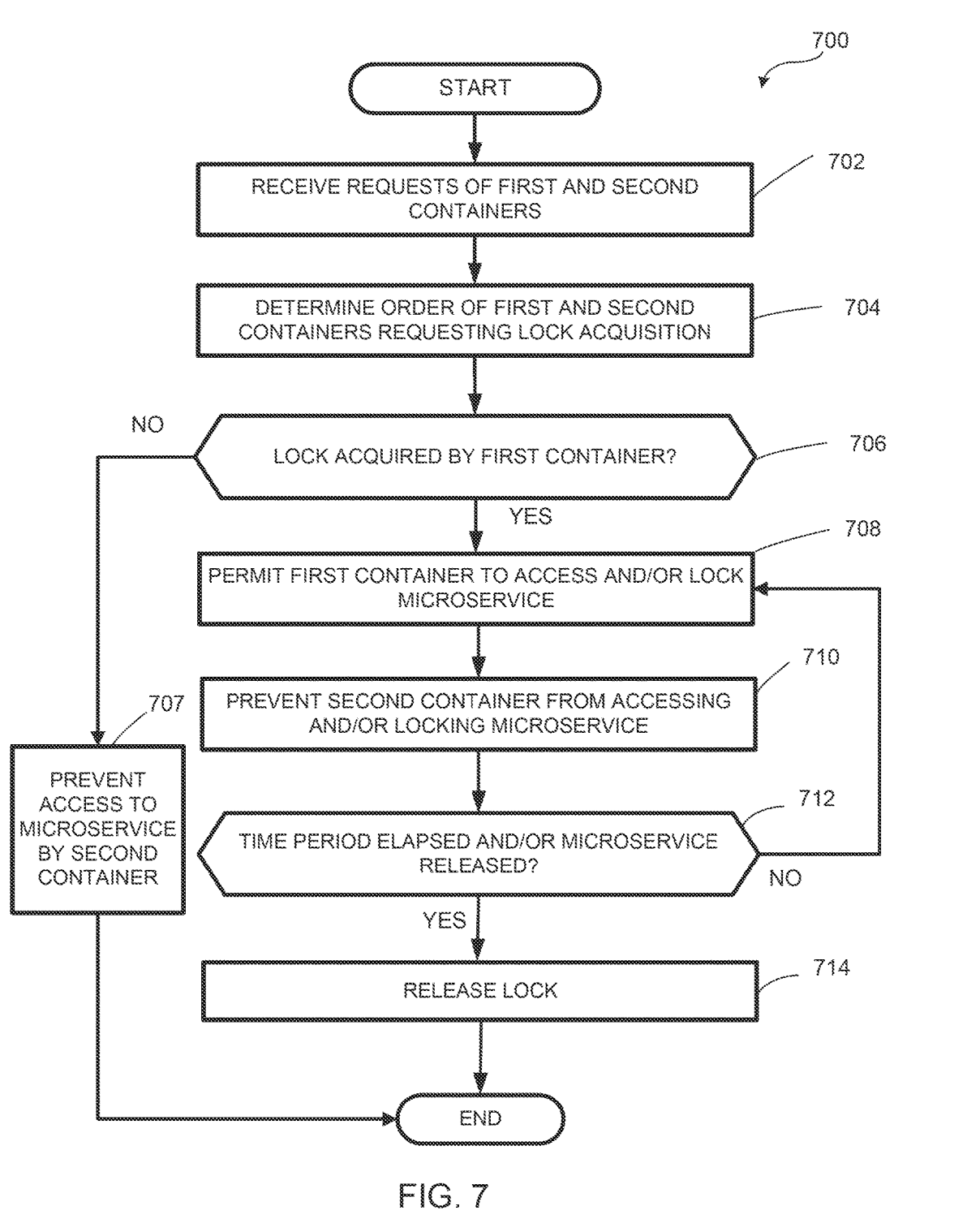
FIG. 7 is a flowchart representative of example machine readable instructions and/or example operations that may be executed, instantiated, and/or performed by example programmable circuitry to implement the example lock control analysis system of FIG. 6.

A flowchart representative of example machine readable instructions, which may be executed by programmable circuitry to implement and/or instantiate the lock control analysis system 600 of FIG. 6 and/or representative of example operations which may be performed by programmable circuitry to implement and/or instantiate the lock control analysis system 600 of FIG. 6, is shown in FIG. 7. The machine readable instructions may be one or more executable programs or portion(s) of one or more executable programs for execution by programmable circuitry such as the programmable circuitry 812 shown in the example processor platform 800 discussed below in connection with FIG. 8 and/or may be one or more function(s) or portion(s) of functions to be performed by the example programmable circuitry (e.g., an FPGA) discussed below in connection with FIGS. 9 and/or 10. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 7, many other methods of implementing the example lock control analysis system 600 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed, instantiated, and/or performed by programmable circuitry to control and/or direct locking of a microservice. The example machine-readable instructions and/or the example operations 700 of FIG. 7 begin at block 702, at which the container analyzer 602 (FIG. 6) and/or the change notification request analyzer 608 (FIG. 6) receives and/or accesses requests from first and second containers. For example, the first and second containers have annotations requesting to lock and/or access the microservice. In this example, requests from the first and second containers to lock and/or access the microservice at the event trigger service 110 shown in FIG. 1 are analyzed by a framework of the event trigger service 110. The requests of the first and second containers pertain to event-based enforcements of the cloud-based service(s) 102 (FIG. 1). In particular, the first and second containers are generated and/or transmitted in the event trigger service 110 based on configuration changes received from and/or conveyed from the EDS 108 (FIG. 1).

At block 704, the container analyzer 602 and/or the change notification request analyzer 608 determines an order of arrival of requests from the first and second containers such that the first and containers both attempt to acquire a lock of the microservice. According to examples disclosed herein, based on an order of receipt of the requests of the first and second containers, the framework of the event trigger service 110 enables the first or second container to proceed further. According to examples disclosed herein, the container analyzer 602 and/or the change notification request analyzer 608 determine that code of the first and second containers includes the annotations request a lock, block and/or utilization of locking semantics pertaining to the same microservice of the cloud-based service(s) 102. In a particular example, the first and second containers are provided based on two different requested configuration changes for the cloud-based service(s) 102 that were provided in response to requests conveyed from the EDS 108 and/or the cloud data collector 106 (FIG. 1) to the event trigger service 110. In some examples, the container analyzer 602 and/or the change notification request analyzer 608 determines whether the annotations of the first and second containers include and/or denote a request or invocation of locking semantics, such as the example annotations and/or annotation structures shown in FIG. 5. In some examples, the change notification request analyzer 608 initiates a lock acquisition cycle such that locking semantics are invoked by the container analyzer 602 as per an order of arrival of the first and second containers and/or requests of the first and second containers. In some examples, an earlier arrival corresponds to a lock acquisition via the example lock manager 604 (FIG. 6). For example, a request from the first container being received first (in comparison to a trailing/subsequent request from the second container), causes the lock manager 604 to enable the first container to acquire the lock of the microservice. In some examples, a lock of the microservice is prevented by the lock manager 604 until a microservice becomes available.

At block 706, the example lock manager 604 determines whether the lock has been acquired by the first container. If the microservice is locked by the first container (block 706: YES), control proceeds to block 708. Otherwise (block 706: NO), the process proceeds to block 707.

At block 707, in some examples, the example lock manager 604 prevents access and/or locking of the microservice by the second container and the process ends. For example, the lock manager 604 prevents providing another container to the cloud-based service(s) 102 as an enforcement via the IDEM service 122 (FIG. 1).

At block 708, the example lock manager 604 and/or enforcement interface 610 permits/enables access and/or locking of the microservice by the first container if the lock is acquired by the first container (block 706). In some examples, the lock manager 604 locks the microservice for access only by the first container or, alternatively, the second container.

At block 710, in examples in which the microservice is locked to the first container, the second container is prevented by the example lock manager 604 and/or the enforcement interface 610 from locking and/or accessing the microservice (and vice-versa). For example, the lock manager 604 and/or the enforcement interface 610 prevents the instructions and/or code associated with the second container form being provided to the enforcement service 112. Additionally or alternatively, the example lock manager 604 and/or the enforcement interface 610 deletes and/or eliminates the second container.

At block 712, it is determined by the example lock manager 604 and/or the enforcement interface 610 as to whether a time period (e.g., a predefined time period, a locking time period, a lock time duration, etc.) of the first container holding the lock of the microservice has elapsed. If the time period has elapsed (block 712: YES), control of the process proceeds to block 714. Otherwise (block 712: NO), the process returns to block 708.

At block 714, the example lock manager 604 and/or the enforcement interface 610 releases the lock of the microservice with respect to the first container, and the instructions of FIG. 7 end. In some examples, the second container is enabled and/or permitted to lock and/or access the microservice for its use once the lock of the microservice pertaining to the first container is released. In other examples, the second container is not executed and/or the second container is not enabled to secure the lock of the microservice for its exclusive access upon the lock being released with respect to the first container.

Figure 8:
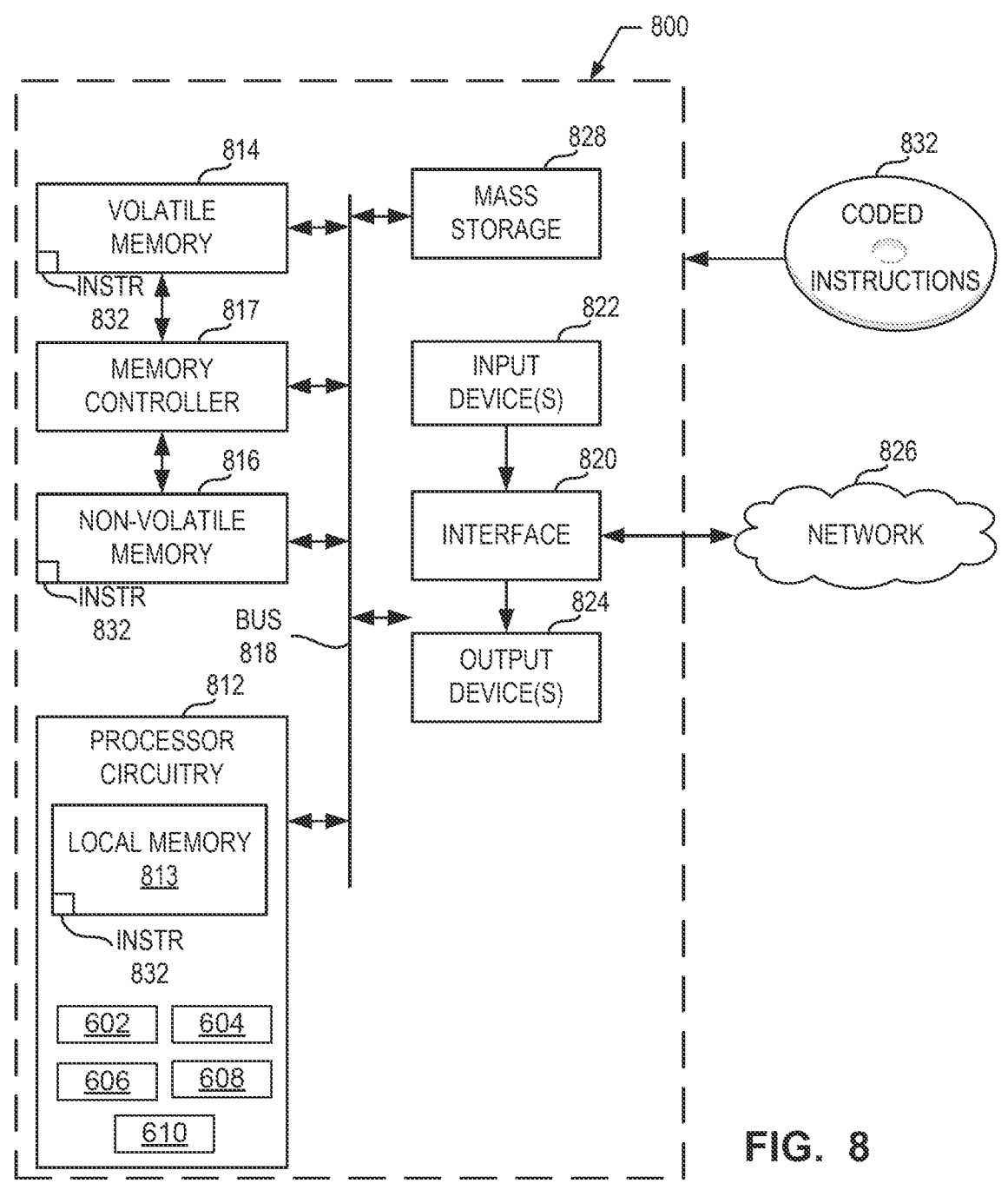
FIG. 8 is a block diagram of an example processing platform including programmable circuitry structured to execute, instantiate, and/or perform the example machine readable instructions and/or perform the example operations of FIG. 7 to implement the lock control analysis system of FIG. 6.

FIG. 8 is a block diagram of an example programmable circuitry platform 800 structured to execute and/or instantiate the example machine-readable instructions and/or the example operations of FIG. 7 to implement the lock control analysis system 600 of FIG. 6. The programmable circuitry platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the example container analyzer 602, the example lock manager 604, the example microservice analyzer 606, the example change notification request analyzer 608, and the example enforcement interface 610.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 832, which may be implemented by the machine readable instructions of FIG. 7, may be stored in the mass storage device 828, in the volatile memory 814, in the non-volatile memory 816, and/or on at least one non-transitory computer readable storage medium such as a CD or DVD which may be removable.

Figure 9:
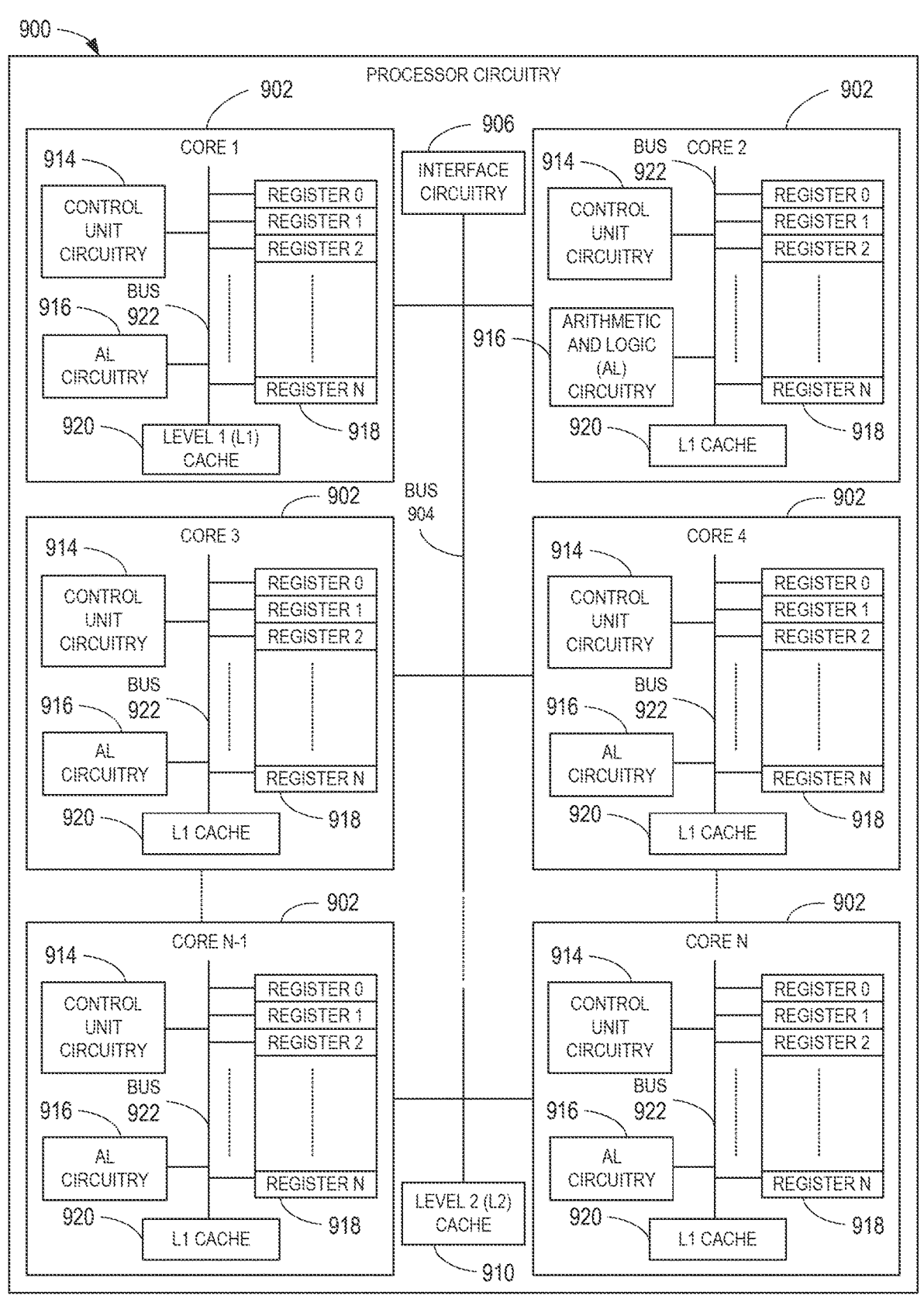
FIG. 9 is a block diagram of an example implementation of the programmable circuitry of FIG. 8.

FIG. 9 is a block diagram of an example implementation of the programmable circuitry 812 of FIG. 8. In this example, the programmable circuitry 812 of FIG. 8 is implemented by a microprocessor 900. For example, the microprocessor 900 may be a general-purpose microprocessor (e.g., general-purpose microprocessor circuitry). The microprocessor 900 executes some or all of the machine-readable instructions of the flowchart of FIG. 7 to effectively instantiate the circuitry of FIG. 6 as logic circuits to perform operations corresponding to those machine readable instructions. In some such examples, the circuitry of FIG. 6 is instantiated by the hardware circuits of the microprocessor 900 in combination with the machine-readable instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating-point operations. In yet other examples, the AL circuitry 916 may include first AL circuitry that performs integer-based operations and second AL circuitry that performs floating-point operations. In some examples, the AL circuitry 916 may be referred to as an Arithmetic Logic Unit (ALU).

The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure, such as by being distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The microprocessor 900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 900, in the same chip package as the microprocessor 900 and/or in one or more separate packages from the microprocessor 900.

Figure 10:
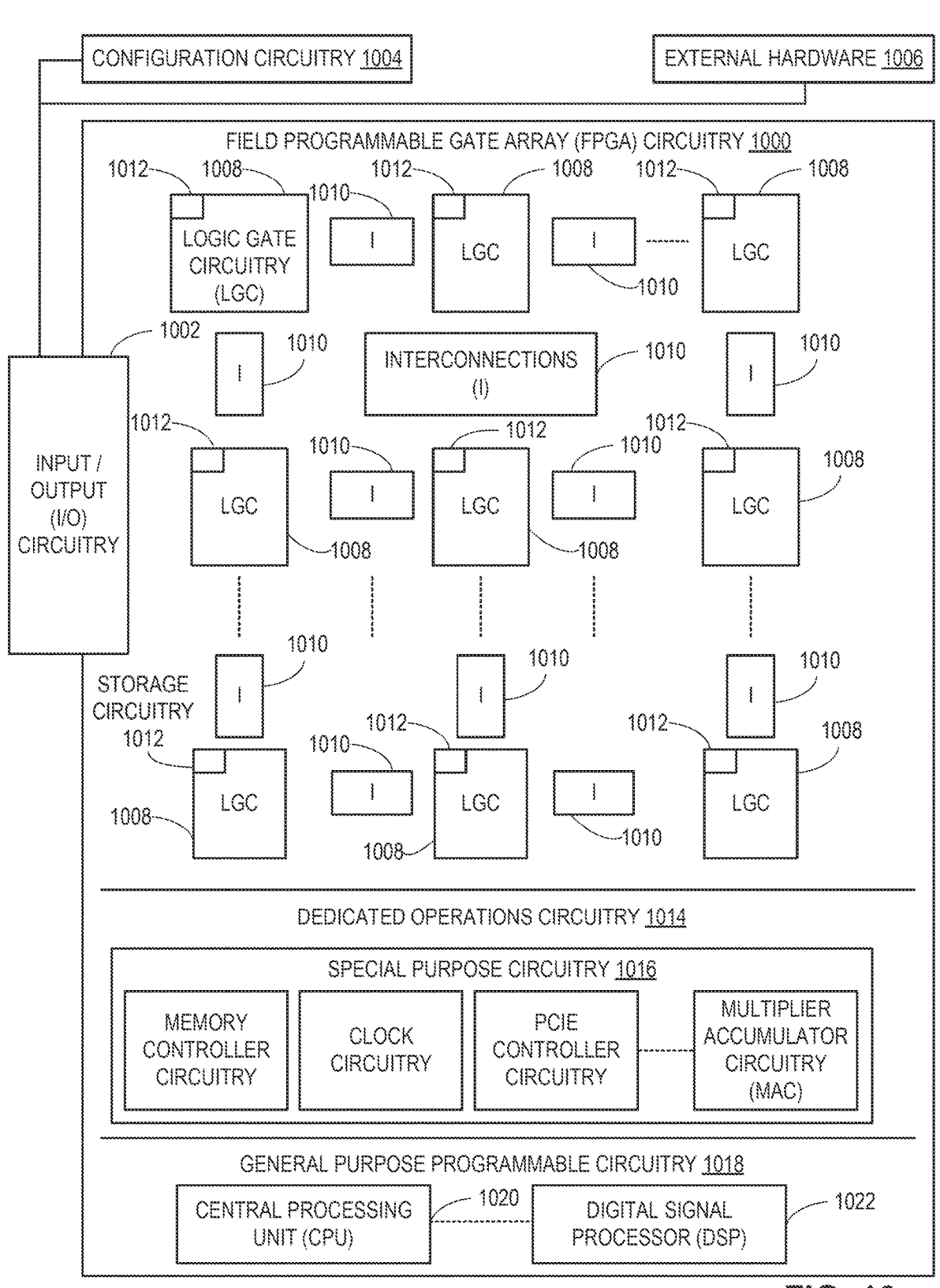
FIG. 10 is a block diagram of another example implementation of the programmable circuitry of FIG. 8.

FIG. 10 is a block diagram of another example implementation of the programmable circuitry 812 of FIG. 8. In this example, the programmable circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 10 includes interconnections and logic circuitry that may be configured, structured, programmed, and/or interconnected in different ways after fabrication to instantiate, for example, some or all of the operations/functions corresponding to the machine readable instructions represented by the flowchart of FIG. 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 7. As such, the FPGA circuitry 1000 may be configured and/or structured to effectively instantiate some or all of the operations/functions corresponding to the machine readable instructions of the flowchart of FIG. 7 as dedicated logic circuits to perform the operations/functions corresponding to those software instructions in a dedicated manner analogous to an ASIC. Therefore, the FPGA circuitry 1000 may perform the operations/functions corresponding to the some or all of the machine readable instructions of FIG. 7 faster than the general-purpose microprocessor can execute the same.

In the example of FIG. 10, the FPGA circuitry 1000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain a binary file, which may be implemented by a bit stream, data, and/or machine-readable instructions, to configure the FPGA circuitry 1000, or portion(s) thereof. In some such examples, the configuration circuitry 1004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof. In some examples, the external hardware 1006 may be implemented by external hardware circuitry. For example, the external hardware 1006 may be implemented by the microprocessor 900 of FIG. 9.

The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations/functions that may correspond to at least some of the machine readable instructions of FIG. 7 and/or other desired operations. The logic gate circuitry 1008 shown in FIG. 10 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations/functions. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example dedicated operations circuitry 1014. In this example, the dedicated operations circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the programmable circuitry 812 of FIG. 8, many other approaches are contemplated. For example, FPGA circuitry may include an on-board CPU, such as one or more of the example CPU 1020 of FIG. 9. Therefore, the programmable circuitry 812 of FIG. 8 may additionally be implemented by combining at least the example microprocessor 900 of FIG. 9 and the example FPGA circuitry 1000 of FIG. 10. In some such hybrid examples, one or more cores 902 of FIG. 9 may execute a first portion of the machine readable instructions represented by the flowchart of FIG. 7 to perform first operation(s)/function(s), the FPGA circuitry 1000 of FIG. 10 may be configured and/or structured to perform second operation(s)/function(s) corresponding to a second portion of the machine readable instructions represented by the flowchart of FIG. 7, and/or an ASIC may be configured and/or structured to perform third operation(s)/function(s) corresponding to a third portion of the machine readable instructions represented by the flowchart of FIG. 7.

It should be understood that some or all of the circuitry of FIG. 6 may, thus, be instantiated at the same or different times. For example, same and/or different portion(s) of the microprocessor 900 of FIG. 9 may be programmed to execute portion(s) of machine-readable instructions at the same and/or different times. In some examples, same and/or different portion(s) of the FPGA circuitry 1000 of FIG. 10 may be configured and/or structured to perform operations/functions corresponding to portion(s) of machine-readable instructions at the same and/or different times.

In some examples, some or all of the circuitry of FIG. 6 may be instantiated, for example, in one or more threads executing concurrently and/or in series. For example, the microprocessor 900 of FIG. 9 may execute machine readable instructions in one or more threads executing concurrently and/or in series. In some examples, the FPGA circuitry 1000 of FIG. 10 may be configured and/or structured to carry out operations/functions concurrently and/or in series. Moreover, in some examples, some or all of the circuitry of FIG. 6 may be implemented within one or more virtual machines and/or containers executing on the microprocessor 900 of FIG. 9.

In some examples, the programmable circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the programmable circuitry 812 of FIG. 8, which may be in one or more packages. For example, the XPU may include a CPU (e.g., the microprocessor 900 of FIG. 9, the CPU 1020 of FIG. 10, etc.) in one package, a DSP (e.g., the DSP 1022 of FIG. 10)

in another package, a GPU in yet another package, and an FPGA (e.g., the FPGA circuitry 1000 of FIG. 10) in still yet another package.

Figure 11:
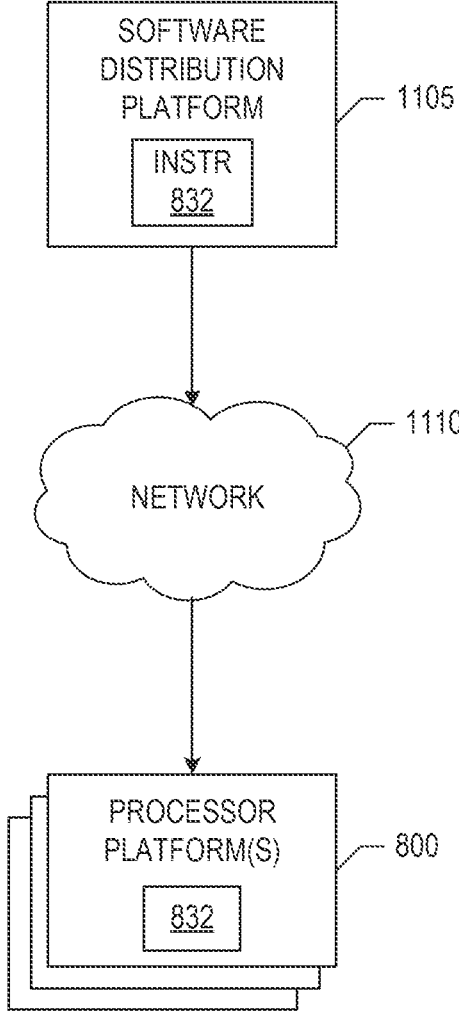
FIG. 11 is a block diagram of an example software/firmware/instructions distribution platform (e.g., one or more servers) to distribute software, instructions, and/or firmware (e.g., corresponding to the example machine readable instructions of FIG. 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to other hardware devices (e.g., hardware devices owned and/or operated by third parties from the owner and/or operator of the software distribution platform) is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions of FIG. 7, as described above. The one or more servers of the example software distribution platform 1105 are in communication with an example network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions of FIG. 7, may be downloaded to the example programmable circuitry platform 800, which is to execute the machine readable instructions 832 to implement the lock control analysis system 600. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices. Although referred to as software above, the distributed "software" could alternatively be firmware.

Example methods, apparatus, systems, and articles of manufacture to enable annotation-based locking semantics of shared resources are disclosed herein. Further examples and combinations thereof include the following:

Example 1 includes a system to manage microservices of a shared resource system, the system comprising interface circuitry, programmable circuitry, and machine readable instructions to cause the programmable circuitry permit a first container to lock a microservice based on an annotation of the first container, the annotation corresponding to a first request to lock the microservice, after the microservice is locked for use by the first container, prevent a second container from locking the microservice, the second container including a second request to lock the microservice, and after expiration of a time period, release the microservice from being locked to the first container.

Example 2 includes the system as defined in example 1, wherein, before the time period expires, the programmable circuitry is to release the microservice based on at least one of the first container releasing the lock of the microservice or execution of the first container being terminated.

Example 3 includes the system as defined in example 2, wherein the programmable circuitry is to determine that the execution of the first container has terminated.

Example 4 includes the system as defined in example 3, wherein the programmable circuitry is to release the microservice prior to the expiration of the time period based on the execution of the first container being terminated.

Example 5 includes the system as defined in any of examples 1 to 4, wherein the interface circuitry is to store the first container and the second container in cache memory.

Example 6 includes the system as defined in any of examples 1 to 5, wherein the programmable circuitry is to determine that the annotation is invoked in a code layer of the first container.

Example 7 includes the system as defined in any of examples 1 to 6, wherein the programmable circuitry is to, after determining that the microservice is not available, prevent, until the microservice becomes available, the first container from locking the microservice.

Example 8 includes the system as defined in any of examples 1 to 7, wherein the microservice is locked for exclusive use by the first container.

Example 9 includes the system as defined in any of examples 1 to 8, wherein the microservice includes a shared resource of a cloud-based service.

Example 10 includes the system as defined in any of examples 1 to 9, wherein the first and second containers are part of an event trigger service of a management system corresponding to a cloud-based service.

Example 11 includes a non-transitory machine readable storage medium comprising instructions to cause programmable circuitry to at least permit a first container to lock a microservice for a time period based on an annotation of the first container, the annotation corresponding to a first request to lock the microservice, and after the microservice is locked for use by the first container, prevent a second container from locking the microservice, the second container having a second request to lock the microservice.

Example 12 includes the non-transitory machine readable storage medium as defined in example 11, wherein the instructions are to cause the programmable circuitry to release the microservice to be available in response to the time period elapsing.

Example 13 includes the non-transitory machine readable storage medium as defined in any of examples 11 or 12, wherein the instructions are to cause the programmable circuitry to, after the first container is terminated while accessing the microservice, release the microservice to be available after the time period elapses.

Example 14 includes the non-transitory machine readable storage medium as defined in any of examples 11 to 13, wherein the instructions are to cause the programmable circuitry to enable the second container to lock the microservice after the time period expires.

Example 15 includes the non-transitory machine readable storage medium as defined in any of examples 11 to 14, wherein the instructions are to cause the programmable circuitry to store the first container and the second container in cache memory.

Example 16 includes the non-transitory machine readable storage medium as defined in any of examples 11 to 15, wherein the instructions are to cause the programmable circuitry to determine that the annotation is invoked in a code layer of the first container.

Example 17 includes the non-transitory machine readable storage medium as defined in any of examples 11 to 16, wherein the instructions are to cause the programmable circuitry to, after determining that the microservice is not available, prevent, until the microservice becomes available, the first container from locking the microservice.

Example 18 includes the non-transitory machine readable storage medium as defined in any of examples 11 to 17, wherein the microservice is locked for exclusive use by the first container.

Example 19 includes the non-transitory machine readable storage medium as defined in any of examples 11 to 18, wherein the first container is permitted to lock the microservice by providing input to a key/value store.

Example 20 includes the non-transitory machine readable storage medium as defined in any of examples 11 to 19, wherein the second container is prevented from locking the microservice by preventing the second container from accessing a key/value store.

Example 21 includes a method comprising permitting, by executing an instruction with programmable circuitry, a first container to lock a microservice for a time period based on an annotation of the first container for use by the first container, the annotation corresponding to a first request to lock the microservice, and after the microservice is locked for use by the first container, preventing, by executing an instruction with the programmable circuitry, a second container from locking the microservice, the second container including a second request to lock the microservice.

Example 22 includes the method as defined in example 21, further including releasing, by executing an instruction with the programmable circuitry, the microservice to be available after the time period has elapsed.

Example 23 includes the method as defined in any of examples 21 or 22, further including, after the first container is terminated, releasing the microservice to be available.

Example 24 includes the method as defined in any of examples 21 to 23, further including enabling the second container to lock the microservice for use by the second container after the time period elapses.

Example 25 includes the method as defined in any of examples 21 to 24, further including determining that the first annotation is invoked in a code layer of the first container.

Example 26 includes the method as defined in any of examples 21 to 25, further including, after determining that the microservice is not available, preventing, until the microservice becomes available, the first container from locking the microservice.

From the foregoing, it will be appreciated that example systems, apparatus, articles of manufacture, and methods have been disclosed that enable a unified ephemeral locking implementation that prevents improper and/or unintended operation of microservices of a distributed/shared computing system. Disclosed systems, apparatus, articles of manufacture, and methods improve the efficiency of using a computing device by unifying logic and enabling less errorprone instructions that can operate more efficiently by utilizing annotations that invoke locking semantics instead of locking semantics being integrated and/or interwoven into business code. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A system to manage microservices of a shared resource system, the system comprising:
   interface circuitry;
   programmable circuitry; and
   machine readable instructions to cause the programmable circuitry:
      permit a first container to lock a microservice based on an annotation of the first container, the annotation corresponding to a first request to lock the microservice;
      determine an order of arrival of lock requests from the first container and the second container and to process lock acquisition according to the order;
      after the microservice is locked for use by the first container, prevent a second container from locking the microservice, the second container including a second request to lock the microservice; and
      after expiration of a time period, release the microservice from being locked to the first container;
      wherein a lock manager prevents instructions associated with the second container from being provided to an enforcement service.

2. The system as defined in claim 1, wherein, before the time period expires, the programmable circuitry is to release the microservice based on at least one of the first container releasing the lock of the microservice or execution of the first container being terminated.

3. The system as defined in claim 2, wherein the programmable circuitry is to determine that the execution of the first container has terminated.

4. The system as defined in claim 3, wherein the programmable circuitry is to release the microservice prior to the expiration of the time period based on the execution of the first container being terminated.

5. The system as defined in claim 1, wherein the interface circuitry is to store the first container and the second container in cache memory.

6. The system as defined in claim 1, wherein the programmable circuitry is to determine that the annotation is invoked in a code layer of the first container.

7. The system as defined in claim 1, wherein the programmable circuitry is to, after determining that the microservice is not available, prevent, until the microservice becomes available, the first container from locking the microservice.

8. The system as defined in claim 1, wherein the microservice is locked for exclusive use by the first container.

9. The system as defined in claim 1, wherein the microservice includes a shared resource of a cloud-based service.

10. The system as defined in claim 1, wherein the first and second containers are part of an event trigger service of a management system corresponding to a cloud-based service.

11. A non-transitory machine readable storage medium comprising instructions to cause programmable circuitry to at least:

permit a first container to lock a microservice for a time period based on an annotation of the first container, the annotation corresponding to a first request to lock the microservice;

determine an order of arrival of lock requests from the first container and the second container and to process lock acquisition according to the order; and after the microservice is locked for use by the first container, prevent a second container from locking the microservice, the second container having a second request to lock the microservice;

wherein a lock manager prevents instructions associated with the second container from being provided to an enforcement service.

12. The non-transitory machine readable storage medium as defined in claim 11, wherein the instructions are to cause the programmable circuitry to release the microservice to be available in response to the time period elapsing.

13. The non-transitory machine readable storage medium as defined in claim 11, wherein the instructions are to cause the programmable circuitry to, after the first container is terminated while accessing the microservice, release the microservice to be available after the time period elapses.

14. The non-transitory machine readable storage medium as defined in claim 11, wherein the instructions are to cause the programmable circuitry to enable the second container to lock the microservice after the time period expires.

15. The non-transitory machine readable storage medium as defined in claim 11, wherein the instructions are to cause the programmable circuitry to store the first container and the second container in cache memory.

16. The non-transitory machine readable storage medium as defined in claim 11, wherein the instructions are to cause the programmable circuitry to determine that the annotation is invoked in a code layer of the first container.

17. The non-transitory machine readable storage medium as defined in claim 11, wherein the instructions are to cause the programmable circuitry to, after determining that the microservice is not available, prevent, until the microservice becomes available, the first container from locking the microservice.

18. The non-transitory machine readable storage medium as defined in claim 11, wherein the microservice is locked for exclusive use by the first container.

19. The non-transitory machine readable storage medium as defined in claim 11, wherein the first container is permitted to lock the microservice by providing input to a key/value store.

20. The non-transitory machine readable storage medium as defined in claim 11, wherein the second container is prevented from locking the microservice by preventing the second container from accessing a key/value store.

21. A method comprising:

permitting, by executing an instruction with programmable circuitry, a first container to lock a microservice for a time period based on an annotation of the first container for use by the first container, the annotation corresponding to a first request to lock the microservice;

determine an order of arrival of lock requests from the first container and the second container and to process lock acquisition according to the order; and after the microservice is locked for use by the first container, preventing, by executing an instruction with the programmable circuitry, a second container from locking the microservice, the second container including a second request to lock the microservice;

wherein a lock manager prevents instructions associated with the second container from being provided to an enforcement service.

22. The method as defined in claim 21, further including releasing, by executing an instruction with the programmable circuitry, the microservice to be available after the time period has elapsed.

23. The method as defined in claim 21, further including, after the first container is terminated, releasing the microservice to be available.

24. The method as defined in claim 21, further including enabling the second container to lock the microservice for use by the second container after the time period elapses.

25. The method as defined in claim 21, further including determining that the first annotation is invoked in a code layer of the first container.

26. The method as defined in claim 21, further including, after determining that the microservice is not available, preventing, until the microservice becomes available, the first container from locking the microservice.

* * * * *